United States Patent
Roy et al.

(10) Patent No.: US 9,102,298 B2
(45) Date of Patent: Aug. 11, 2015

(54) FOAM-IN-PLACE INTERIOR PANELS HAVING INTEGRATED AIRBAG DOORS INCLUDING SUBSTRATES WITH AIRBAG CHUTE-DOOR ASSEMBLIES FOR MOTOR VEHICLES

(71) Applicant: Faurecia Interior Systems, Inc., Auburn Hills, MI (US)

(72) Inventors: Wes Roy, Oakland, MI (US); James Steele, Macomb, MI (US); Raymond E. Kalisz, Livonia, MI (US); Scott Beam, Commerce Township, MI (US); Adrien Bender, Clawson, MI (US)

(73) Assignee: FAURECIA INTERIOR SYSTEMS, INC., Auburn Hills, MI (US)

( * ) Notice: Subject to any disclaimer, the term of this patent is extended or adjusted under 35 U.S.C. 154(b) by 28 days.

(21) Appl. No.: 14/108,700

(22) Filed: Dec. 17, 2013

(65) Prior Publication Data
US 2015/0035260 A1 Feb. 5, 2015

Related U.S. Application Data

(60) Provisional application No. 61/861,494, filed on Aug. 2, 2013.

(51) Int. Cl.
*B60R 21/215* (2011.01)
*B60R 21/205* (2011.01)

(52) U.S. Cl.
CPC ............. *B60R 21/215* (2013.01); *B60R 21/205* (2013.01)

(58) Field of Classification Search
CPC .. B60R 21/215; B60R 21/205; B60R 21/217; B60R 21/2176; B60R 2021/21531
USPC .................................... 280/728.3, 732, 728.2
See application file for complete search history.

(56) References Cited

U.S. PATENT DOCUMENTS 5,135,252 A  8/1992  Suran et al.
5,145,207 A  9/1992  Bederka et al.
(Continued)

FOREIGN PATENT DOCUMENTS

DE   102006008564 A1   8/2007
DE   102007007822 A1   9/2007
(Continued)

OTHER PUBLICATIONS

USPTO, Notice of Allowance and Fee(s) Due for U.S. Appl. No. 14/108,895, mailed Aug. 8, 2014.
(Continued)

*Primary Examiner* — Joseph Rocca
*Assistant Examiner* — Joselynn Y Sliteris
(74) *Attorney, Agent, or Firm* — Ingrassia Fisher & Lorenz PC

(57) ABSTRACT

Interior panels having integrated airbag doors for motor vehicles are provided. In one example, an interior panel comprises a substrate having outer and inner surfaces and an opening extending therethrough. An airbag chute-door assembly is mounted to the substrate and comprises a chute wall that at least partially surrounds an interior space. The chute wall is configured for stowing an airbag module. The chute wall defines an expansion feature that facilitates moving sections of the chute wall for assembling the airbag module to the chute wall. A door flap portion is pivotally connected to the chute wall and at least partially covers the opening. A perimeter flange extends from the chute wall and has a flange section that overlies the outer surface of the substrate. A skin covering extends over the substrate and a foam is disposed between the skin covering and the substrate.

12 Claims, 6 Drawing Sheets

(56) References Cited

U.S. PATENT DOCUMENTS

| | | | |
|---|---|---|---|
| 5,303,951 | A | 4/1994 | Goestenkors et al. |
| 5,342,090 | A | 8/1994 | Sobczak et al. |
| 5,482,313 | A | 1/1996 | Ikeya et al. |
| 5,527,063 | A | 6/1996 | Garner et al. |
| 5,588,669 | A | 12/1996 | Leonard et al. |
| 5,611,564 | A | 3/1997 | Bauer |
| 5,704,635 | A | 1/1998 | Tajiri et al. |
| 5,851,023 | A | 12/1998 | Nagata et al. |
| 5,887,891 | A | 3/1999 | Taquchi et al. |
| 5,961,142 | A | 10/1999 | Shiraki et al. |
| 6,152,480 | A * | 11/2000 | Iwanaga ............ 280/728.3 |
| 6,161,862 | A | 12/2000 | Rose et al. |
| 6,161,865 | A | 12/2000 | Rose et al. |
| 6,193,271 | B1 | 2/2001 | Shimane |
| 6,250,669 | B1 | 6/2001 | Ohmiya |
| 6,371,508 | B1 * | 4/2002 | Baur et al. ............ 280/728.2 |
| 6,406,056 | B2 | 6/2002 | Yokota |
| 6,457,739 | B1 | 10/2002 | Dailey et al. |
| 6,457,744 | B1 | 10/2002 | Tonooka |
| 6,460,874 | B1 | 10/2002 | McDonnell et al. |
| 6,543,802 | B1 | 4/2003 | Uchiyama et al. |
| 6,557,886 | B1 | 5/2003 | Sakaguchi |
| 6,716,519 | B2 | 4/2004 | Ueno et al. |
| 6,726,239 | B1 | 4/2004 | Teranishi et al. |
| 6,929,280 | B2 * | 8/2005 | Yasuda et al. ............ 280/728.2 |
| 7,063,349 | B2 | 6/2006 | Takahashi |
| 7,237,797 | B2 | 7/2007 | Dailey et al. |
| 7,434,828 | B2 | 10/2008 | Okamoto et al. |
| 7,543,845 | B2 | 6/2009 | Dailey et al. |
| 7,607,681 | B2 | 10/2009 | Okada et al. |
| 7,690,677 | B2 | 4/2010 | Cowelchuk et al. |
| 7,695,001 | B2 * | 4/2010 | Adler et al. ............ 280/728.3 |
| 7,708,309 | B2 * | 5/2010 | Kim et al. ............ 280/731 |
| 7,766,372 | B2 | 8/2010 | Hillman |
| 7,841,618 | B2 * | 11/2010 | Idomoto et al. ............ 280/728.3 |
| 7,914,039 | B2 | 3/2011 | Mazzocchi et al. |
| 7,980,586 | B2 * | 7/2011 | Yamauchi et al. ......... 280/728.2 |
| 7,992,890 | B2 | 8/2011 | Nogaret et al. |
| 8,336,906 | B2 | 12/2012 | Kim et al. |
| 8,336,908 | B1 | 12/2012 | Kalisz et al. |
| 8,469,393 | B1 | 6/2013 | Siewert et al. |
| 8,474,861 | B1 | 7/2013 | Twork |
| 2001/0026063 | A1 | 10/2001 | Yokota |
| 2002/0042235 | A1 | 4/2002 | Ueno et al. |
| 2002/0063415 | A1 | 5/2002 | Uchiyama et al. |
| 2003/0189321 | A1 | 10/2003 | Takahashi |
| 2003/0234521 | A1 | 12/2003 | Schenck et al. |
| 2004/0126532 | A1 | 7/2004 | Gardner, Jr. |
| 2004/0145164 | A1 | 7/2004 | North |
| 2004/0174000 | A1 | 9/2004 | Speelman et al. |
| 2005/0167958 | A1 | 8/2005 | Okada et al. |
| 2005/0225062 | A1 | 10/2005 | Dumbrique |
| 2006/0214339 | A1 | 9/2006 | Miyake |
| 2007/0045995 | A1 | 3/2007 | Adler et al. |
| 2007/0205585 | A1 | 9/2007 | Okada et al. |
| 2008/0018081 | A1 | 1/2008 | Yang et al. |
| 2008/0128943 | A1 | 6/2008 | Hager |
| 2009/0309338 | A1 | 12/2009 | Hillman |
| 2010/0230938 | A1 | 9/2010 | Mazzocchi et al. |
| 2010/0230939 | A1 | 9/2010 | Mazzocchi et al. |
| 2011/0062685 | A1 | 3/2011 | Kim et al. |
| 2011/0248482 | A1 | 10/2011 | Kim |
| 2012/0007346 | A1 | 1/2012 | Morawietz et al. |
| 2012/0217729 | A1 | 8/2012 | Horibe et al. |

FOREIGN PATENT DOCUMENTS

| | | |
|---|---|---|
| DE | 102008011697 A1 | 9/2009 |
| DE | 102008021157 A1 | 10/2009 |
| DE | 102009024193 A1 | 5/2010 |
| DE | 102011001981 A1 | 5/2012 |
| DE | 102012212985 A1 | 2/2013 |
| JP | H0330641 U | 3/1991 |
| JP | H11151728 A | 6/1999 |
| JP | H11321513 A | 11/1999 |
| JP | 2004243594 A | 9/2004 |
| JP | 2005008057 A | 1/2005 |
| JP | 2007145211 A | 6/2007 |
| JP | 2008126972 A | 6/2008 |
| JP | 2008149810 A | 7/2008 |
| WO | 02055346 A1 | 7/2002 |
| WO | 2005023589 A2 | 3/2005 |

OTHER PUBLICATIONS

USPTO, Notice of Allowance and Fee(s) Due for U.S. Appl. No. 14/108,915, mailed Aug. 25, 2014.

* cited by examiner

FOAM-IN-PLACE INTERIOR PANELS HAVING INTEGRATED AIRBAG DOORS INCLUDING SUBSTRATES WITH AIRBAG CHUTE-DOOR ASSEMBLIES FOR MOTOR VEHICLES

CROSS-REFERENCE TO RELATED APPLICATIONS

This application is related to and claims all available benefit of U.S. Provisional Patent Application 61/861,494 filed Aug. 2, 2013, the entire contents of which are herein incorporated by reference.

FIELD OF THE INVENTION

The technical field relates generally to interior panels structured for inflatable restraints for motor vehicles, and more particularly to foam-in-place interior panels having integrated airbag doors including substrates with airbag chute-door assemblies for motor vehicles.

BACKGROUND

Motor vehicles often include an inflatable restraint apparatus having an airbag device with a deployable airbag positioned in or behind an interior vehicle panel, such as an instrument panel, door panel, seats, and the like. Many interior panels include an integrated airbag door formed into the interior panel that is designed to break free upon deployment of the airbag. Often an area of the interior panel surrounding the integrated airbag door is scored or pre-weakened to form a seam that facilitates a clean airbag deployment e.g., airbag deployment with minimal or no fragmentation.

Foam-in-place (FIP) interior panels are often used to provide a padded finish to desired areas of the interiors of motor vehicles. FIP interior panels include a substrate and a skin covering with a foam layer formed between the skin covering and the substrate to provide padding for a softer finish. During fabrication, the foam layer is typically formed by injecting a foam forming material(s) between the substrate and the skin covering. In FIP interior panels that include an airbag device, an opening is typically defined in the substrate to accommodate the airbag device.

In one example, disclosed in U.S. Pat. No. 7,237,797 issued to Dailey et al., a modular airbag door assembly that includes a door panel and an airbag chute is mounted to a substrate of a FIP instrument panel. The modular airbag door assembly is positioned on a front side of the substrate with the door panel extending over an opening formed through the substrate and the airbag chute extending through the opening to the back side of the substrate. The modular airbag door assembly is mounted to the substrate using threaded fasteners that extend through the substrate and project rearwardly from the back side of the substrate. A pre-weakened skin covering with an underlying foam layer is then formed over the front side of the substrate so that the modular airbag door assembly is integrated into the FIP instrument panel hidden behind the pre-weakened skin covering and the foam layer. An airbag device is then mounted to both the chute portion and the substrate adjacent to the back side of the substrate using the projecting threaded fasteners. Unfortunately, this arrangement is relatively complex using multiple parts including threaded fasteners and manufacturing steps for assembling and accommodating the airbag device in the FIP instrument panel.

Accordingly, it is desirable to provide FIP interior panels having integrated airbag doors with improvements for assembling and accommodating airbag devices. Furthermore, other desirable features and characteristics of the present invention will become apparent from the subsequent detailed description and the appended claims, taken in conjunction with the accompanying drawings and this background.

BRIEF SUMMARY

Interior panels having integrated airbag doors for motor vehicles are provided herein. In accordance with an exemplary embodiment, an interior panel having an integrated airbag door for a motor vehicle includes, but is not limited to, a substrate having an outer surface, an inner surface, and an opening extending therethrough. An airbag chute-door assembly is mounted to the substrate. The airbag chute-door assembly comprises a chute wall at least partially surrounding an interior space. The chute wall is configured for stowing an airbag module that contains an airbag and to direct passage of the airbag through the interior space towards the opening during deployment. The chute wall defining an expansion feature that facilitates moving sections of the chute wall from a nominal position away from each other to an expanded position for advancing the airbag module in the interior space to mount to the chute wall. A door flap portion is pivotally connected to the chute wall and at least partially covers the opening. A perimeter flange extends from the chute wall away from the interior space. The perimeter flange has a flange section that overlies the outer surface of the substrate. A skin covering extends over the substrate. A foam is disposed between the skin covering and the substrate.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following Detailed Description is merely exemplary in nature and is not intended to limit the various embodiments or the application and uses thereof. Furthermore, there is no intention to be bound by any theory presented in the preceding background or the following detailed description.

Various embodiments contemplated herein relate to FIP interior panels having integrated airbag doors for motor vehicles. The exemplary embodiments taught herein provide an interior panel having an integrated airbag door for a motor vehicle. The interior panel comprises a substrate that has an outer surface, an inner surface, and an opening extending therethrough. An airbag chute-door assembly is mounted to the substrate. The airbag chute-door assembly comprises a chute wall that at least partially surrounds an interior space. The chute wall is configured for stowing an airbag module that contains an airbag and to direct passage of the airbag through the interior space towards the opening during deployment. A door flap portion is pivotally connected to the chute wall and at least partially covers the opening. A perimeter flange extends from the chute wall away from the interior space. The perimeter flange has a flange section that overlies the outer surface of the substrate.

In an exemplary embodiment, the substrate has an inner perimeter edge that defines the opening and a plurality of locking tabs that extend into the opening and the chute wall defines a plurality of rib and/or tab features that engage the locking tabs to fixedly mount the airbag chute-door assembly to the substrate. As such, advantageously, assembly of the airbag chute-door assembly to the substrate is facilitated because the locking tabs and the rib and/or tab features fix the airbag chute-door assembly to the substrate without the use of threaded fasteners. After assembling the airbag chute-door assembly to the substrate, a skin covering, which may be pre-weakened, and an underlying foam layer are formed over the substrate and the airbag chute-door assembly to define a FIP interior panel.

In an exemplary embodiment, the chute wall has a plurality of openings formed therethrough configured for receiving hooks that are disposed on an airbag module (e.g., airbag device) for mounting the airbag module to the chute wall. Additionally, the chute wall defines an expansion feature(s) that facilitates moving sections of the chute wall from a nominal position away from each other to an expanded position for advancing the airbag module in the interior space to mount to the chute wall. In an exemplary embodiment, the expansion feature is configured to urge the sections of the chute wall from the expanded position back to the nominal position when the airbag module is mounted to the chute wall. As such, advantageously, assembly of the airbag module to the airbag chute-door assembly is facilitated without the use of threaded fasteners.

Figure 1:
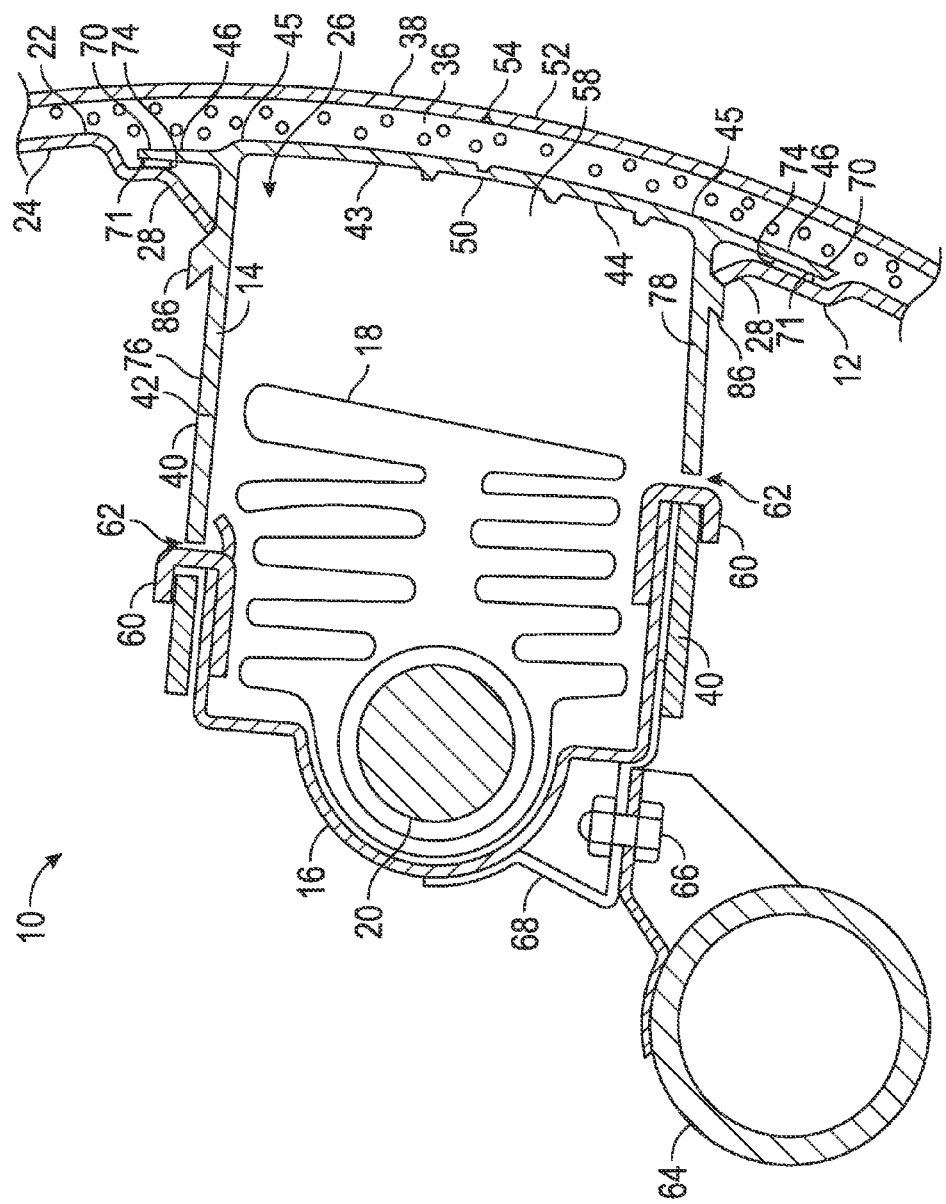
FIG. 1 is a sectional view of an airbag chute-door assembly in accordance with an exemplary embodiment.

FIG. 1 is a vertical sectional view of an interior panel 10 including a substrate 12 and an airbag chute-door assembly 14 for a motor vehicle in accordance with an exemplary embodiment. In an exemplary embodiment, the interior panel 10 is an instrument panel that can be positioned forward of a driver seat and a front passenger seat in an interior of the motor vehicle. As such, FIG. 1 depicts a view of the interior panel 10 forward of the front passenger seat. Alternatively, the interior panel 10 can be a door panel or other interior vehicle trim panel. As illustrated, the interior panel 10 comprises the substrate 12, the airbag chute-door assembly 14, and an airbag module 16 that contains a deployable airbag 18 and an inflator 20.

The substrate 12 has an outer surface 22 that faces towards the interior of the motor vehicle, an inner surface 24 that faces away from the interior of the motor vehicle, and an opening 26 that is formed through the substrate 12. As illustrated, the opening 26 is defined by inner perimeter edges 28 of the substrate 12 and is covered by the airbag chute-door assembly 14, which is mounted to the substrate 12 as will be described in further detail below. The substrate 12 may be formed of a plastic material, such as, for example, styrene maleic anhydride (SMA), polycarbonate (PC), ABS, PC/ABS, polypropylene (PP), or any other substrate material for vehicle interior applications known to those skilled in the art. The outer surface 22 of the substrate 12 and the airbag chute-door assembly 14 are covered by foam 36 and a skin covering 38 to define the interior panel 10 as an FIP interior panel.

The airbag chute-door assembly 14 comprises a chute wall 40 that defines a chute portion 42, door flap portions 43 and 44 that are pivotally connected to the chute portion 42 via corresponding hinges 45, and a perimeter flange 46 that surrounds the chute portion 42. As illustrated, the door flap portions 43 and 44 are coupled together by a seam 50 to form an "H-pattern" door arrangement. Alternative door arrangements known to those skilled in the art may also be used, such as, for example a "U-pattern" door arrangement with only a single door flap portion. The door flap portions 43 and 44 and the overlying foam 36 and skin covering 38 together define an integrated airbag door 52 that opens in a parting manner along the seam 50 to permit the airbag 18 to unfold and inflate outside of the interior panel 10. To facilitate the opening of the integrated airbag door 52, the skin covering 38 may be pre-weakened to define a seam 54 that tears during airbag deployment.

The chute wall 40 at least partially surrounds an interior space 58. The interior space 58 is sized to permit passage of the airbag 18 towards the door flap portions 43 and 44 and the integrated airbag door 52 during airbag deployment. Attached to the chute wall 40 is the airbag module 16 that accommodates the airbag 18 in the folded state. As shown and will be discussed in further detail below, the airbag module 16 has a plurality of hooks 60 that project outwardly through chute wall openings 62 to engage the chute wall 40. The airbag module 16 is attached to a cross member 64 by a bolt and nut 66 via a supporting member 68.

The perimeter flange 46 extends from the chute wall 40 away from the interior space 58 and has a flange section 70. The flange section 70 overlies the outer surface 22 of the substrate 12. In an exemplary embodiment, a foam gasket 71 is disposed between the flange section 70 and the outer surface 22 of the substrate to form a seal 74 substantially or completely around the opening 26. During an early fabrication stage for forming the foam 36, this arrangement advantageously allows the seal 74 to prevent leakage of a liquid foam forming material into the interior space 58.

Figure 2:
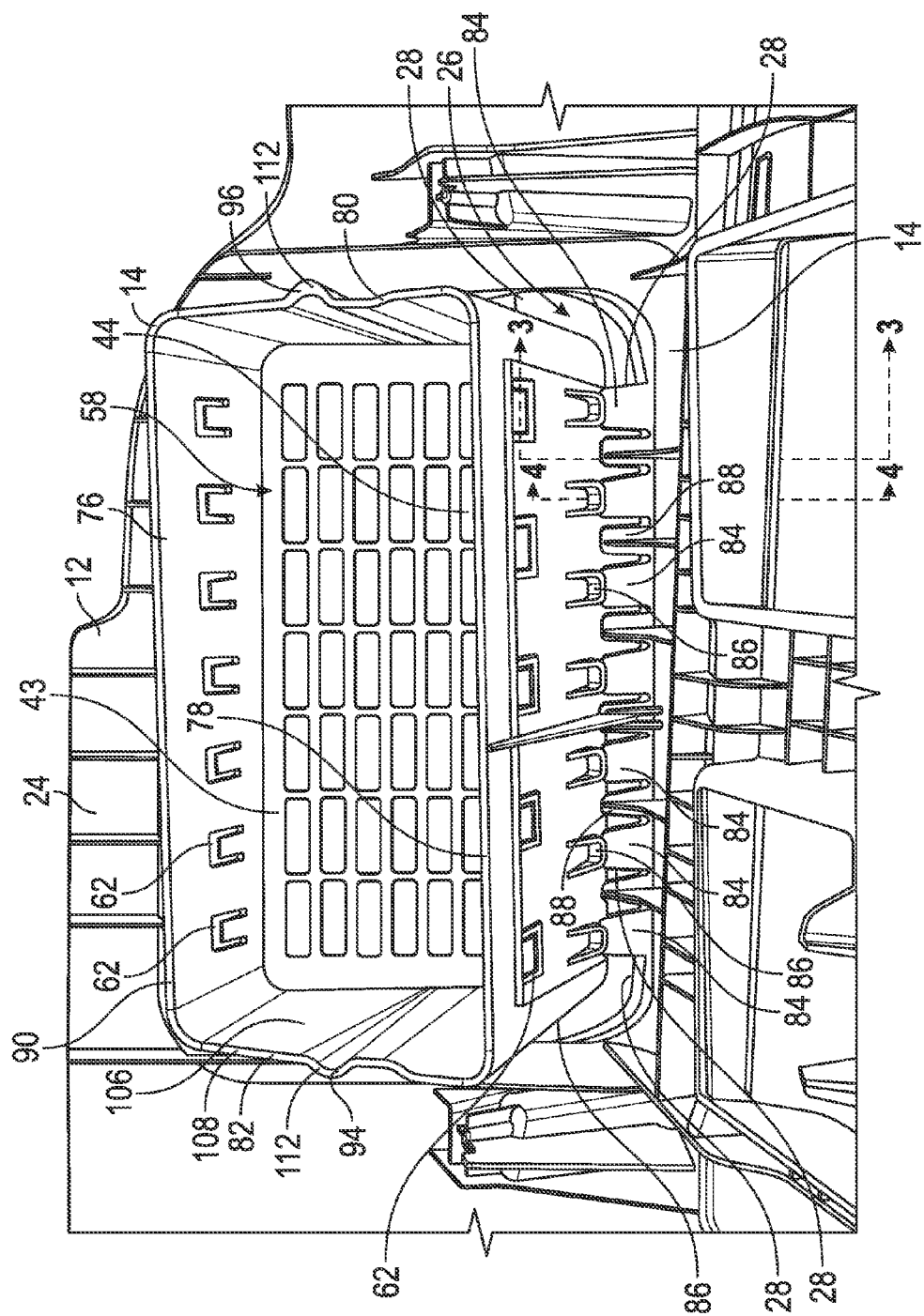
FIG. 2 is a rearview of an airbag chute-door assembly in accordance with an exemplary embodiment.
Figure 3:
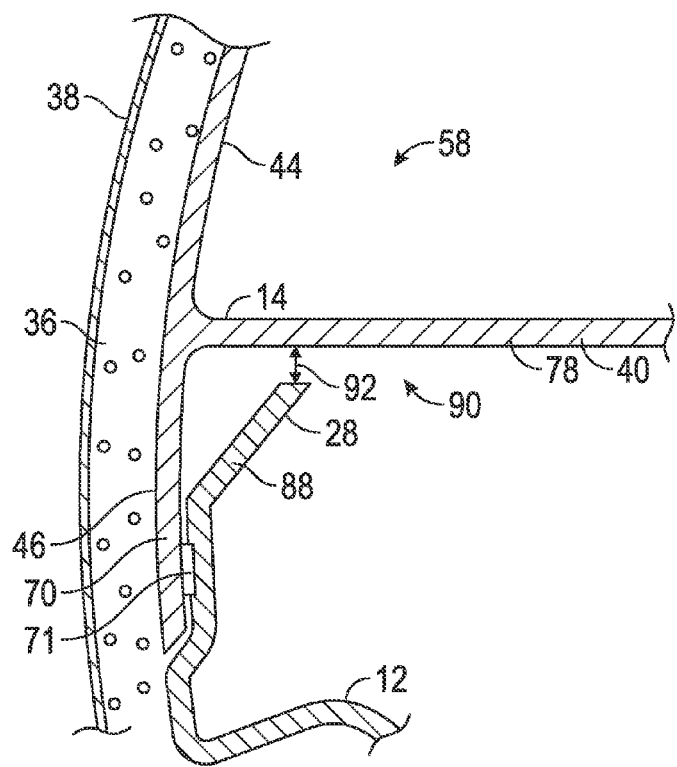
FIG. 3 is a sectional view taken along line 3-3 of the airbag chute-door assembly depicted in FIG. 2.
Figure 4:
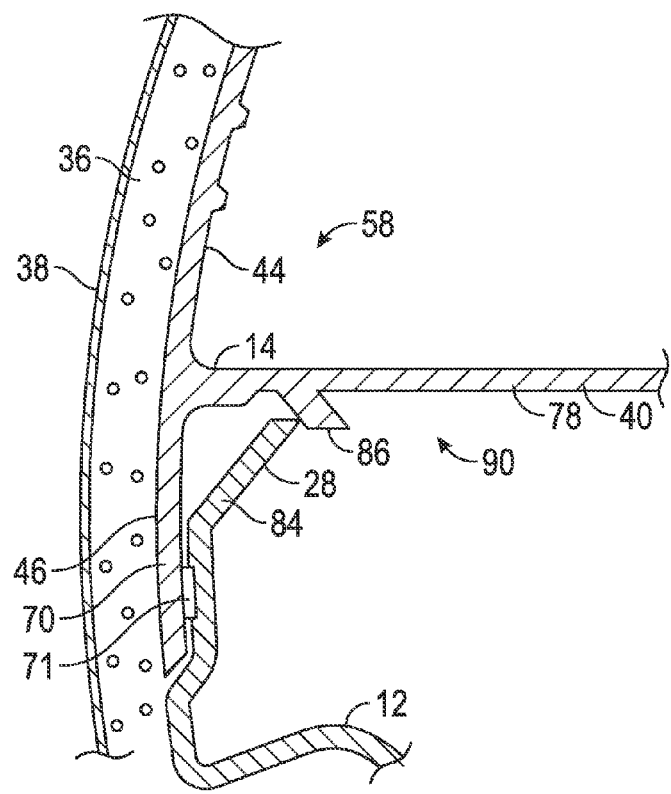
FIG. 4 is a sectional view taken along line 4-4 of the airbag chute-door assembly depicted in FIG. 2.

FIG. 2 is a rearview of the substrate 12 and the airbag chute-door assembly 14 in accordance with an exemplary embodiment. FIGS. 3-4 are sectional views of the substrate 12 and the airbag chute-door assembly 14 depicted in FIG. 2 along lines 3-3 and 4-4, respectively. Referring to FIGS. 1-4, the chute wall 40 has an upper wall section 76, a lower wall section 78 that is disposed opposite the upper wall section 76 about the interior space 58, and lateral wall sections 80 and 82 that are disposed opposite each other about the interior space 58. As illustrated, the inner perimeter edges 28 of the substrate 12 define a plurality of locking tabs 84 that extend into the opening 26. Correspondingly, the chute wall 40 defines a plurality of rib and/or tab features 86 that correspondingly engage the locking tabs 84 for fixedly mounting the airbag chute-door assembly 14 to the substrate 12. In an exemplary embodiment and as illustrated, the rib and/or tab features 86 are formed along the upper and lower wall sections 76 and 78.

In an exemplary embodiment, the inner perimeter edges 28 defined a plurality of expansion control tabs 88 that are intermittently disposed between the locking tabs 84. As illustrated, the expansion control tabs 88 are spaced apart from the chute wall 40 when the chute wall 40 is in a nominal position 90 (e.g., design or relaxed condition) but advantageously interface with the chute wall 40 during deployment of the airbag 18 to limit outward movement of the chute wall 40 to help direct passage of the airbag 18 towards the opening 26 and the door flap portions 43 and 44. In an exemplary embodiment, the expansion control tabs 88 are spaced apart from the chute wall 40 a distance (indicated by double headed arrow 92) of from about 3 to about 8 mm.

Figure 5A:
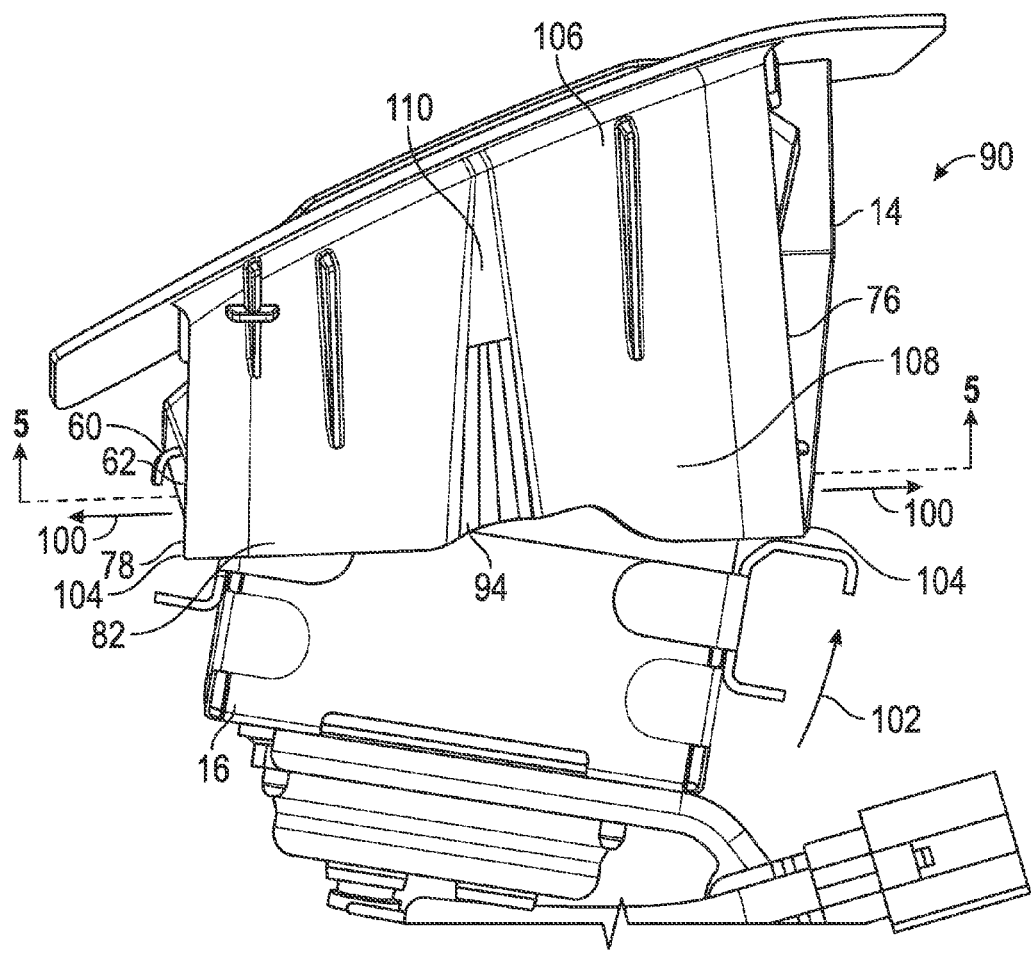
FIG. 5A is a side view of an airbag module during assembly to an airbag chute-door assembly in accordance with an exemplary embodiment.
Figure 5B:
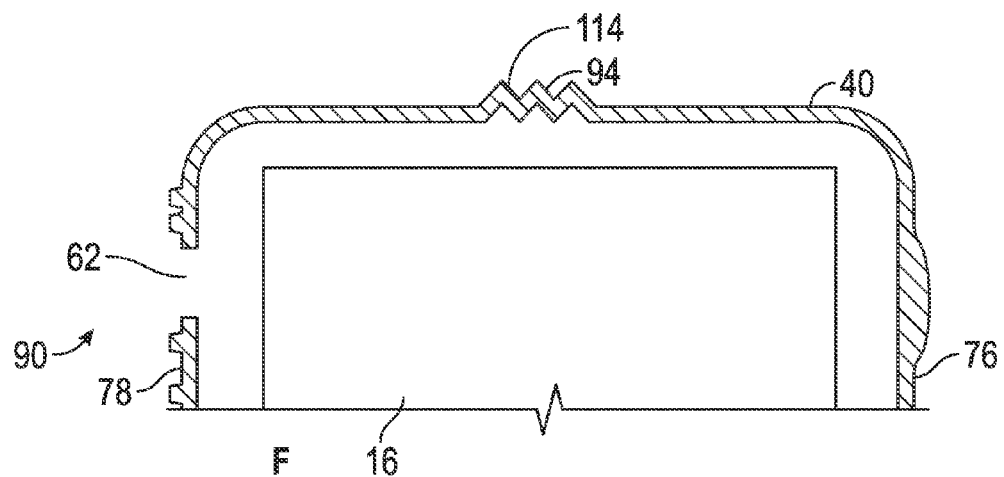
FIG. 5B is a sectional view of the airbag module and the airbag chute-door assembly in a nominal position depicted in FIG. 5A.
Figure 5C:
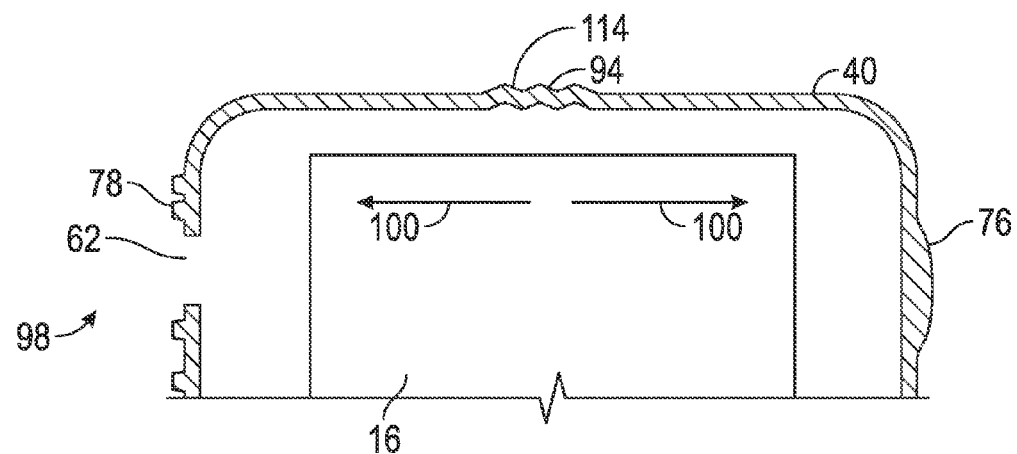
FIG. 5C is a sectional view of the airbag module and the airbag chute-door assembly in an expanded position depicted in FIG. 5A.

FIG. 5A is a side view of the airbag module 16 during assembly to the airbag chute-door assembly 14 in accordance with an exemplary embodiment. FIGS. 5B and 5C are sectional views of the airbag module 16 and the airbag chute-door assembly 14 depicted in FIG. 5A along line 5-5 when the chute wall 40 is in the nominal position 90 and when the chute wall 40 is in an expanded position 98, respectively. Referring to FIGS. 2 and 5A-5C, as discussed above, the upper and lower wall sections 76 and 78 of the chute wall 40 have the chute wall openings 62 formed therethrough. As illustrated in FIG. 5B, the airbag module 16 is assembled or mounted to the airbag chute-door assembly 14 by initially positioning the hooks 60 that are disposed along one side of the airbag module 16 into the corresponding chute wall openings 62 that are formed in one side of the chute wall 40 (e.g., the upper or lower wall section 76 or 78) when the chute wall is in the nominal position 90.

To facilitate positioning the remaining hooks 60 of the airbag module 16 into the corresponding remaining chute wall openings 62, the chute wall 40 has expansion features 94 and 96 that allow sections of the chute wall 40 in the nominal position 90 (shown FIG. 5B) to be moved away from each other to the expanded position 98 (shown FIG. 5C). The chute wall 40 has a proximal edge portion 106 adjacent to the opening 26 in the substrate 12 and a distal edge portion 108 disposed opposite the proximal edge portion 106 away from the opening 26. In an exemplary embodiment and as illustrated in FIG. 5A, the expansion features 94 and 96 have tapered profiles 110 extending between the proximal and distal edge portions 106 and 108 in which the tapered profiles 110 taper along the chute wall 40 from the distal edge portion 108 towards the proximal edge portion 106. Advantageously, this allows for greater movement of the chute wall 40 proximate the distal edge portion 108 to facilitate assembling the airbag module 16 to the airbag chute-door assembly 14. In an exemplary embodiment and as illustrated in FIG. 2, the expansion features 94 and 96 are each defined by a bowed section 112 that bows outwardly from adjacent sections of the chute wall 40 away from the interior space 58. Advantageously, this configuration does not encroach on the interior space 58 to facilitate the airbag 18 passing through the interior space 58 during airbag deployment. In an alternative embodiment and as illustrated in FIGS. 5B-5C, the expansion features 94 and 96 are each defined by an accordion configured section 114 of the chute wall 40. Advantageously, this configuration is very tooling friendly to allow changes to be made to a tool for forming the airbag chute-door assembly 14 based on later design modification to the airbag chute-door assembly 14.

In an exemplary embodiment and as illustrated in FIGS. 2 and 5A-5C, the expansion features 94 and 96 are disposed along the lateral wall sections 80 and 82 to allow the upper and lower wall sections 76 and 78 to be move outwardly (indicated by arrows 100) to the expanded position 98. As such, advantageously the sections of the chute wall 40 can be moved to the expanded position 98 to allow the airbag module 16 to be rotated upwardly (indicated by arrow 102) into the interior space 58 to position the hooks 60 that are disposed along another side of the airbag module 16 into the corresponding chute wall openings 62 formed along the other side of the chute wall 40 (the upper or lower wall section 76 or 78). In an exemplary embodiment, the expansion features 94 and 96 cooperate to facilitate moving portions 104 of the upper and lower wall sections 76 and 78 of the chute wall 40 relative to each other from the nominal position 90 to the expanded position 98 a distance of from about 5 to about 30 mm.

Figure 6:
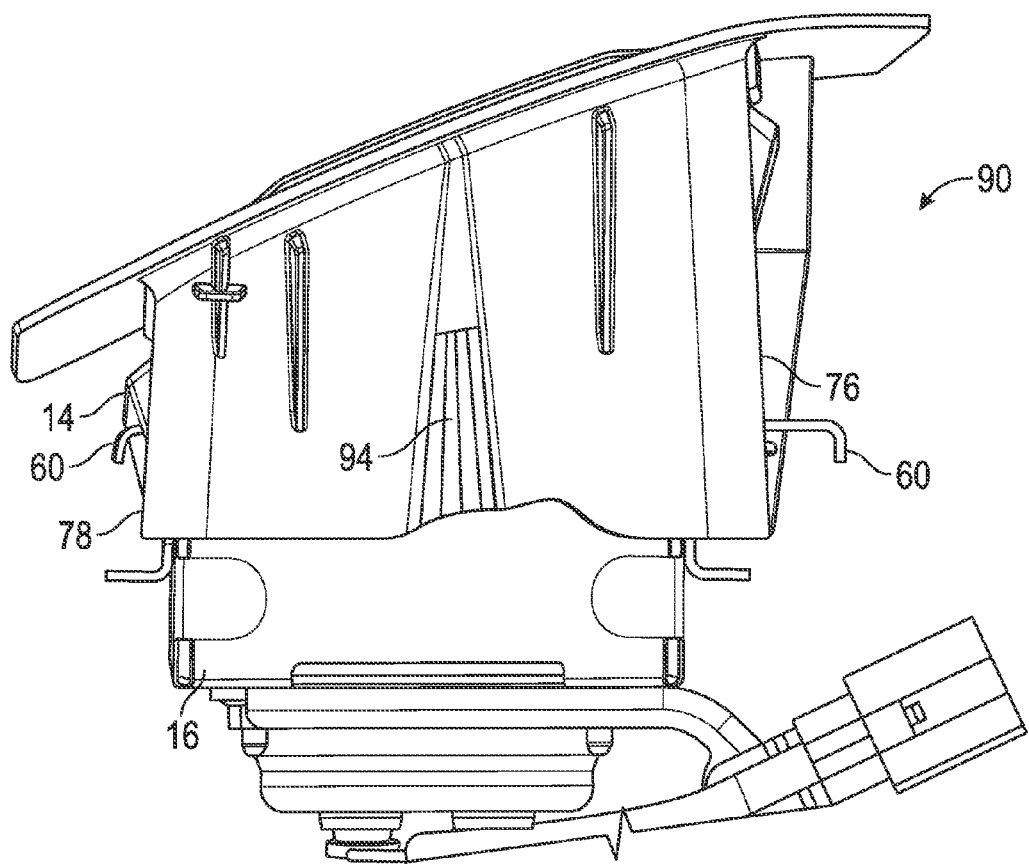
FIG. 6 is a side view of an airbag module mounted to an airbag chute-door assembly in accordance with an exemplary embodiment.

FIG. 6 is a side view of the airbag module 16 fully mounted to the airbag chute-door assembly 14 in accordance with an exemplary embodiment. The airbag chute-door assembly 14 may be formed of a elastomeric material, such as TPE, TPO, or the like, for example as a single injection molded piece. As such, the expansion features 94 and 96 may act as elastic or spring features that urge the sections, e.g., upper and lower wall sections 76 and 78, of the chute wall 40 from the expanded position 98 back to the nominal position 90 when the airbag module 16 is mounted to the chute wall 40.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. An interior panel having an integrated airbag door for a motor vehicle, the interior panel comprising:
   a substrate having an outer surface, an inner surface, and an opening extending therethrough;
   an airbag chute-door assembly mounted to the substrate, wherein the airbag chute-door assembly comprises:
   a chute wall at least partially surrounding an interior space and configured for stowing an airbag module that contains an airbag and to direct passage of the airbag through the interior space towards the opening during deployment, wherein the chute wall defines an expansion feature that facilitates moving sections of the chute wall from a nominal position away from each other to an expanded position for advancing the airbag module in the interior space to mount to the chute wall, wherein the expansion feature is defined by a bowed section of the chute wall when in the nominal position;
   a door flap portion pivotally connected to the chute wall and at least partially covering the opening; and
   a perimeter flange extending from the chute wall away from the interior space, wherein the perimeter flange has a flange section overlying the outer surface of the substrate;
   a skin covering extending over the substrate; and
   a foam disposed between the skin covering and the substrate.

2. The interior panel of claim 1, wherein the expansion feature is configured to urge the sections of the chute wall from the expanded position back to the nominal position when the airbag module is mounted to the chute wall.

3. The interior panel of claim 1, wherein the chute wall has a proximal edge portion adjacent to the opening in the substrate and a distal edge portion disposed opposite the proximal edge portion away from the opening in the substrate, and wherein the expansion feature has a tapered profile extending between the distal and proximal edge portions.

4. The interior panel of claim 3, wherein the tapered profile tapers along the chute wall from the distal edge portion towards the proximal edge portion.

5. The interior panel of claim 1, wherein the bowed section is bowed outwardly from adjacent sections of the chute wall away from the interior space.

6. The interior panel of claim 1, wherein the chute wall has an upper wall section, a lower wall section that is disposed opposite the upper wall section about the interior space, and a first lateral wall section, and a second lateral wall section that is disposed opposite the first lateral wall section about the interior space, wherein the first and second lateral wall sections extend between the lower and upper wall sections, and wherein the expansion feature is disposed along the first lateral wall section.

7. The interior panel of claim 6, wherein the chute wall further defines an additional expansion feature that allows the sections of the chute wall in the nominal position to be moved away from each other to define the expanded position, and wherein the additional expansion feature is disposed along the second lateral wall section.

8. The interior panel of claim 7, wherein the expansion feature and the additional expansion feature are cooperatively configured to facilitate moving portions of the upper and lower wall sections of the chute wall relative to each other from the nominal position to the expanded position a distance of from about 5 to about 30 mm.

9. The interior panel of claim 7, wherein the upper and lower wall sections of the chute wall define a plurality of chute wall openings formed therethrough configured to receive hooks disposed on the airbag module for mounting to the chute wall.

10. The interior panel of claim 1, wherein the substrate has an inner perimeter edge that defines the opening and a plurality of locking tabs that extend into the opening, and wherein the chute wall defines a plurality of rib and/or tab features that are correspondingly configured to engage the locking tabs for mounting the airbag chute-door assembly to the substrate.

11. An interior panel having an integrated airbag door for a motor vehicle, the interior panel comprising:
a substrate having an outer surface, an inner surface, and an opening extending therethrough;
an airbag chute-door assembly mounted to the substrate, wherein the airbag chute-door assembly comprises:
a chute wall at least partially surrounding an interior space and configured for stowing an airbag module that contains an airbag and to direct passage of the airbag through the interior space towards the opening during deployment, wherein the chute wall defines an expansion feature that facilitates moving sections of the chute wall from a nominal position away from each other to an expanded position for advancing the airbag module in the interior space to mount to the chute wall, wherein the expansion feature is defined by an accordion configured section of the chute wall when in the nominal position;
a door flap portion pivotally connected to the chute wall and at least partially covering the opening; and
a perimeter flange extending from the chute wall away from the interior space, wherein the perimeter flange has a flange section overlying the outer surface of the substrate:
a skin covering extending over the substrate; and
a foam disposed between the skin covering and the substrate.

12. An interior panel having an integrated airbag door for a motor vehicle, the interior panel comprising:
a substrate having an outer surface, an inner surface, and an opening extending therethrough;
an airbag chute-door assembly mounted to the substrate, wherein the airbag chute-door assembly comprises:
a chute wall at least partially surrounding an interior space and configured for stowing an airbag module that contains an airbag and to direct passage of the airbag through the interior space towards the opening during deployment, wherein the chute wall defines an expansion feature that facilitates moving sections of the chute wall from a nominal position away from each other to an expanded position for advancing the airbag module in the interior space to mount to the chute wall;
a door flap portion pivotally connected to the chute wall and at least partially covering the opening; and
a perimeter flange extending from the chute wall away from the interior space, wherein the perimeter flange has a flange section overlying the outer surface of the substrate;
a skin covering extending over the substrate; and
a foam disposed between the skin covering and the substrate, wherein the substrate has an inner perimeter edge that defines the opening and a plurality of locking tabs that extend into the opening, wherein the chute wall defines a plurality of rib and/or tab features that are correspondingly configured to engage the locking tabs for mounting the airbag chute-door assembly to the substrate, and wherein the inner perimeter edge further defines a plurality of expansion control tabs intermittently disposed between the locking tabs, and wherein the expansion control tabs are configured for interfacing with the chute wall during deployment of the airbag to limit outward movement of the chute wall.

\* \* \* \* \*